US012539563B2

(12) United States Patent
Mach et al.

(10) Patent No.: US 12,539,563 B2
(45) Date of Patent: Feb. 3, 2026

(54) METHOD FOR THE CUTTING MACHINING OF A WORKPIECE, AND SOFTWARE PROGRAM PRODUCT

(71) Applicant: TRUMPF Werkzeugmaschinen SE + Co. KG, Ditzingen (DE)

(72) Inventors: Patrick Mach, Korb (DE); Frederick Struckmeier, Heimsheim (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 868 days.

(21) Appl. No.: 17/842,824

(22) Filed: Jun. 17, 2022

(65) Prior Publication Data

US 2022/0314370 A1 Oct. 6, 2022

Related U.S. Application Data

(63) Continuation of application No. PCT/EP2020/086859, filed on Dec. 17, 2020.

(30) Foreign Application Priority Data

Dec. 18, 2019 (DE) ..................... 10 2019 134 854.4

(51) Int. Cl.
*B23K 26/38* (2014.01)
*B23K 26/03* (2006.01)

(52) U.S. Cl.
CPC ............ *B23K 26/38* (2013.01); *B23K 26/032* (2013.01)

(58) Field of Classification Search
CPC .............................. B23K 26/032; B23K 26/38
(Continued)

(56) References Cited

U.S. PATENT DOCUMENTS 8,455,787 B2 * 6/2013 Takada ................... B23K 26/38
219/121.6
9,031,688 B2 * 5/2015 Himeno ........... G05B 19/40932
700/178
(Continued)

FOREIGN PATENT DOCUMENTS

CN 105740953 A 7/2016
DE 4316843 A1 11/1994
(Continued)

*Primary Examiner* — Jimmy Chou
(74) *Attorney, Agent, or Firm* — LEYDIG, VOIT & MAYER, LTD.

(57) ABSTRACT

A method for cutting machining of a plate-shaped workpiece, including determining the position of the support points either by measuring or inferring the position of the support points and/or the relative position of the workpiece, establishing starting-point-free regions, establishing endpoint-free regions, establishing starting-point-free and endpoint-free regions depending on the inferred or measured position of the support points and/or the relative position of the workpiece, establishing a grid of possible starting points and end points, omitting the starting-point-free and endpoint-free regions determined in advance, either calculating a torque in a stabilizing and/or tilting direction or calculating a tilt height and/or a tilt depth for each of the points on the grid, setting a priority of points on the grid, transmitting the priority of points to a route planning means of the cutting head, and selecting one of the points on the grid and carrying out the cutting machining.

7 Claims, 7 Drawing Sheets

(58) Field of Classification Search
USPC .................................................. 219/121.72
See application file for complete search history.

(56) References Cited

U.S. PATENT DOCUMENTS

| | | | | |
|---|---|---|---|---|
| 11,899,436 B2* | 2/2024 | Fischer | .............. | G05B 19/4097 |
| 12,042,948 B2* | 7/2024 | Ottnad | .................. | B26D 5/007 |
| 2004/0016731 A1 | 1/2004 | Erlenmaier | | |
| 2009/0127762 A1* | 5/2009 | Kilian | ................ | B23K 37/0408 |
| | | | | 269/296 |
| 2009/0250445 A1* | 10/2009 | Yamaguchi | .......... | G05B 19/404 |
| | | | | 219/121.72 |
| 2010/0176099 A1* | 7/2010 | Hilderbrand | ......... | G05B 19/401 |
| | | | | 340/686.1 |
| 2010/0193479 A1* | 8/2010 | Takada | .................. | B23K 26/38 |
| | | | | 219/121.6 |
| 2012/0109352 A1* | 5/2012 | Himeno | .......... | G05B 19/40932 |
| | | | | 700/103 |
| 2016/0096239 A1* | 4/2016 | Raichle | .............. | B23K 26/1436 |
| | | | | 219/74 |
| 2019/0240786 A1* | 8/2019 | Mach | ................. | B23K 26/0876 |
| 2019/0247961 A1* | 8/2019 | Ottnad | ................... | B23K 26/16 |
| 2021/0138589 A1* | 5/2021 | Bader | ................ | G05B 19/4061 |
| 2021/0213581 A1* | 7/2021 | Struckmeier | ........ | B23Q 17/003 |
| 2022/0314370 A1* | 10/2022 | Mach | ..................... | B23K 26/70 |
| 2023/0054278 A1* | 2/2023 | Sepp | ...................... | B23K 31/10 |

FOREIGN PATENT DOCUMENTS

| | | | | | |
|---|---|---|---|---|---|
| DE | 102014200208 | B3 * | 6/2015 | ......... | B23K 26/0884 |
| DE | 102016220844 | A1 | 8/2019 | | |
| EP | 1340584 | B1 | 7/2006 | | |
| EP | 2029313 | B1 | 12/2010 | | |
| EP | 2029314 | B1 | 3/2012 | | |
| JP | H07299682 | A | 11/1995 | | |
| JP | H09271977 | A | 10/1997 | | |
| WO | WO 2018077763 | A1 | 5/2018 | | |
| WO | WO 2018224697 | A1 | 12/2018 | | |

* cited by examiner

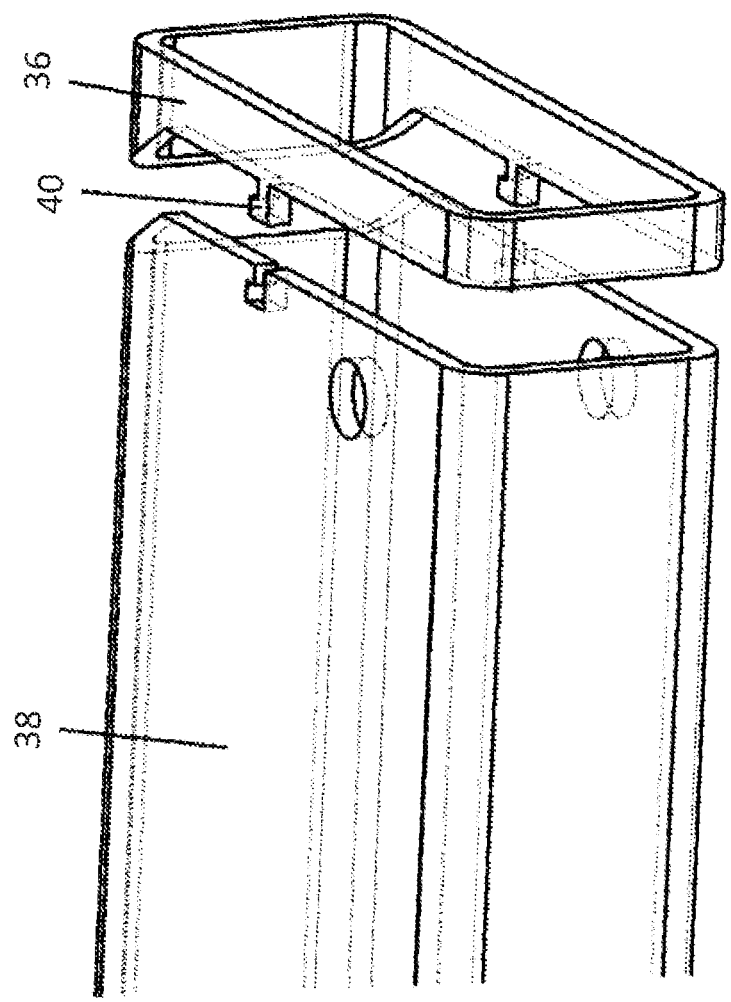

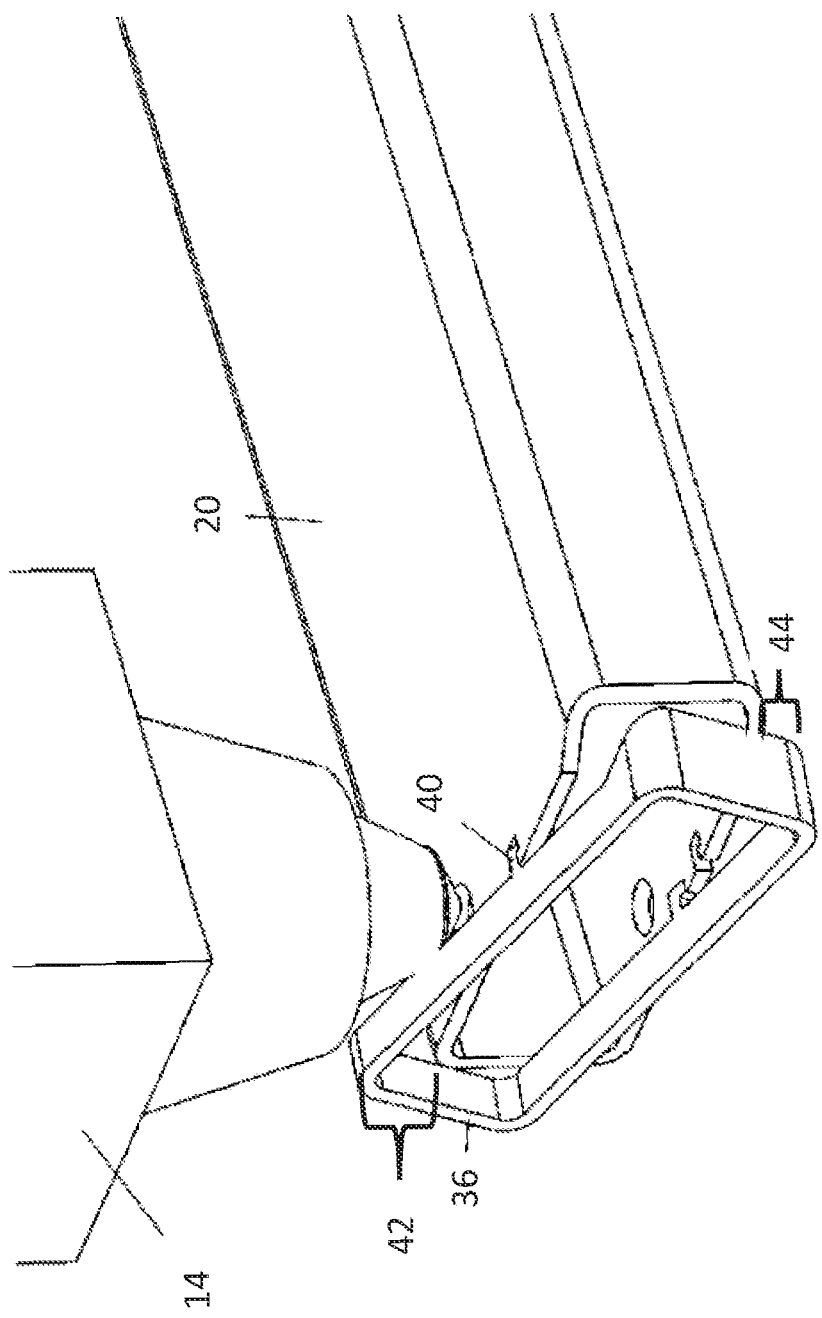

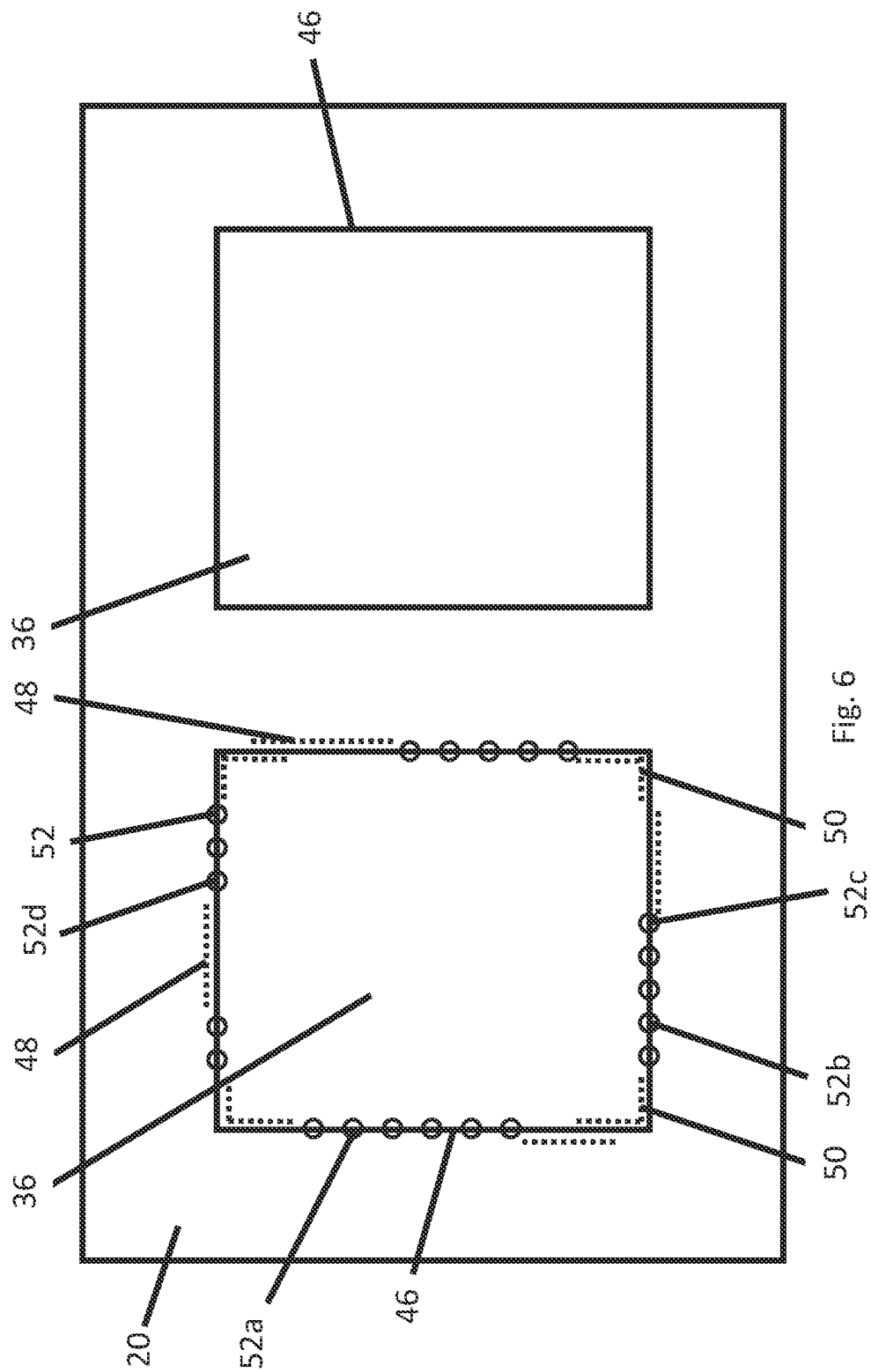

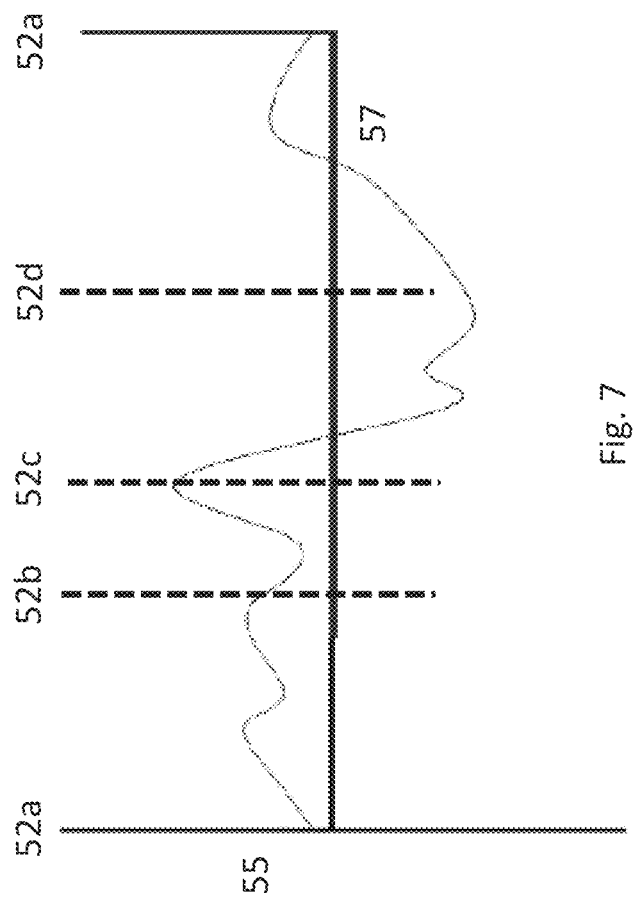

METHOD FOR THE CUTTING MACHINING OF A WORKPIECE, AND SOFTWARE PROGRAM PRODUCT

CROSS REFERENCE TO RELATED APPLICATIONS

This application is a continuation of International Application No. PCT/EP2020/086859 (WO 2021/123044 A1), filed on Dec. 17, 2020, and claims benefit to German Patent Application No. DE 10 2019 134 854.4, filed on Dec. 18, 2019. The aforementioned applications are hereby incorporated by reference herein.

FIELD

The invention relates to a method for the cutting machining of a workpiece.

BACKGROUND

The beam cutting apparatus comprises a workpiece support with a plurality of support points for the workpiece. The workpiece support serves to receive the workpiece.

During the cutting machining, the cutting head is positioned at a cutting height above the workpiece and, in cutting mode, is moved along the cutting contour, as a result of which the workpiece is cut or the workpiece part is cut out.

Known 2D laser cutting apparatuses with a displaceable cutting head allow automated manufacture of workpiece parts with high precision and permit even small batch sizes to be manufactured. When the workpiece parts are being cut out of the workpiece, the problem can arise that a cut-out workpiece part tilts with respect to the rest of the workpiece. This can lead to a collision with the cutting head positioned at the cutting height.

In practice, the use of a reduced packing density of the workpiece parts, for example, to solve this problem is known. The workpiece parts are thus positioned far enough apart that a collision between a cut-out, tilted workpiece part and the cutting head can be reliably avoided. This leads to poor material utilization and thus elevated costs. If a workpiece part contains one or more other workpiece parts that have to be cut at predefined positions relative to the external workpiece part, such a solution cannot be used.

It is also known from practice to fix the almost completely cut-free workpiece parts by what are referred to as "microjoints", that is to say narrow connecting webs to the rest of the workpiece (residual grid). Retaining the microjoints prevents the cut-out workpiece parts from tilting and thus collisions between them and the cutting head. The microjoints are severed after all workpiece parts have been processed in order to ultimately cut off the workpiece parts. The microjoints can be severed manually or mechanically, it possibly being necessary to rework the cut edges. In the case of workpiece parts with small tolerances, it is sometimes not possible to use microjoints at all.

SUMMARY

In an embodiment, the present disclosure provides a method for cutting machining of a plate-shaped workpiece, a workpiece part being cut out of the workpiece along a cutting contour, a beam cutting apparatus with a cutting head being used for the cutting machining, and the beam cutting apparatus comprising a workpiece support with a plurality of support points for receiving the workpiece, the method comprising determining a position of the support points either by measuring a position of the support points and/or a relative position of the workpiece with respect to the support points or inferring the position of the support points and/or the relative position of the workpiece with respect to the support points, establishing starting-point-free regions depending on a shape of the cutting contour, establishing end-point-free regions depending on the shape of the cutting contour and/or requirements for a cutting quality, establishing starting-point-free and end-point-free regions depending on the inferred or measured position of the support points and/or the relative position of the workpiece with respect to the support points, establishing a grid of possible starting points and end points, omitting the starting-point-free and end-point-free regions determined in advance, either calculating a torque in a stabilizing and/or tilting direction about a relevant tilt axis for each of the points on the grid taking into account the shape of the cutting contour and also at least the material thickness, material density and/or the gas pressure of the cutting head, or calculating a tilt height and/or a tilt depth for each of the points on the grid taking into account the shape of the cutting contour and also the position of the support points, setting a priority of points on the grid, ordered by the highest torques in the stabilizing direction and/or the lowest tilt heights or tilt depths or torques in the tilting direction, and transmitting the priority of points to a route planning means of the cutting head, and selecting one of the points on the grid and carrying out the cutting machining.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 4 shows a tubular workpiece;
FIG. 5 shows the machining of a tubular workpiece;
FIG. 6 shows a plate-shaped workpiece;
and
FIG. 7 shows a moment profile along a cutting contour of a workpiece part.

DETAILED DESCRIPTION

Figure 1:
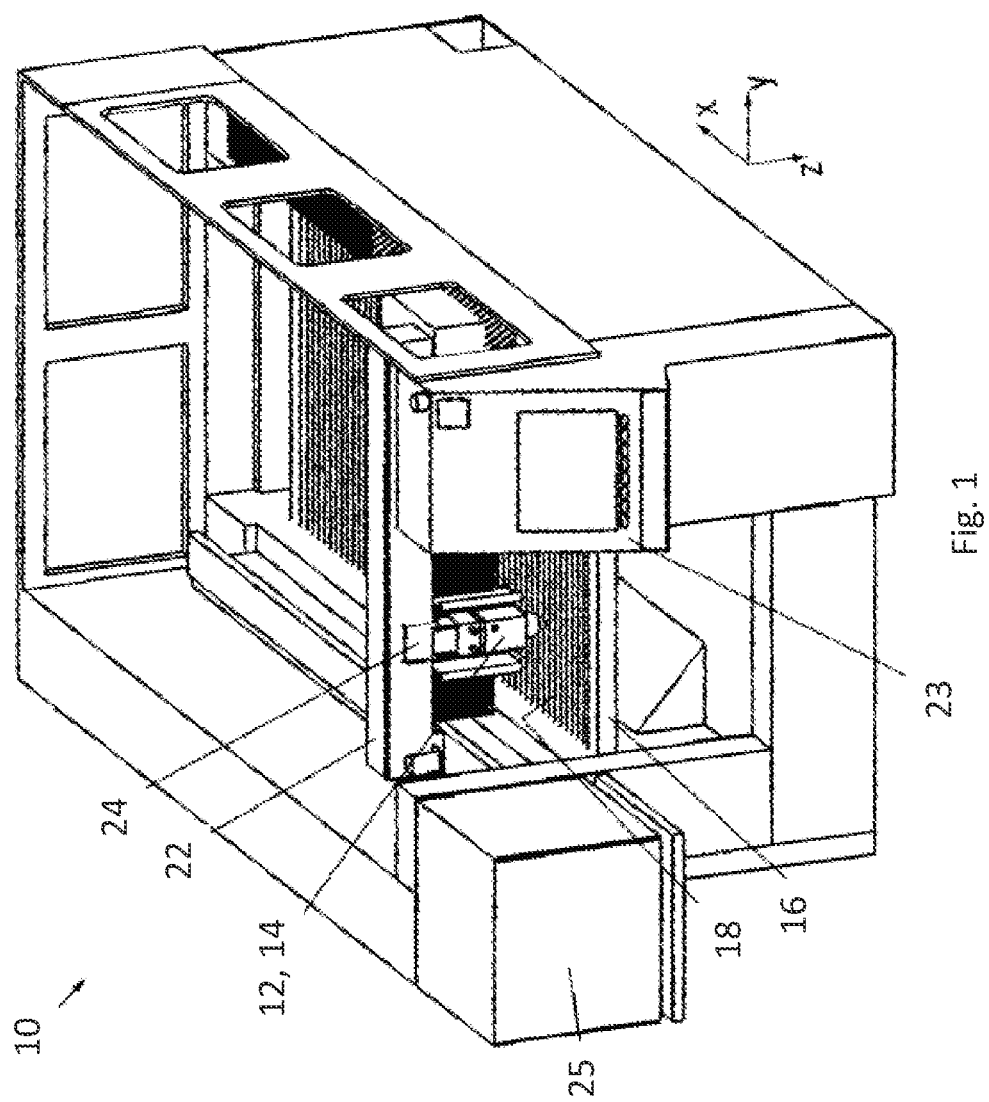
FIG. 1 shows a beam cutting apparatus.

In an embodiment of the present invention, an improved method is disclosed for the cutting machining of workpieces in an advantageous way that reliably and safely avoids collisions between tilted workpiece parts and the cutting head or else other movable parts. The workpiece may in particular be plate-shaped or tubular. In cutting machining, a workpiece part is cut out of the workpiece along a cutting contour. Within the scope of the method, a beam cutting apparatus, in particular laser cutting apparatus, with a cutting head is used for the cutting machining.

This is achieved according to the invention in that the method comprises the following steps:

A step of determining the position of the support points. This step may comprise either measuring a position of the support points and/or a relative position of the workpiece with respect to the support points, or it may comprise inferring the position of the support points and/or the relative position of the workpiece with respect to the support points. In this context, what is meant by measuring is the sensor-based detection (for example via machine vision) of the positions. What is meant by inferring is deriving the positions on the basis of inferences or detected indirect indicators. Possible types of measurement will be discussed below in yet more detail.

The method further comprises a step of establishing starting-point-free regions depending on a shape of the cutting contour. In the starting-point-free regions, it is thus established that there should be no starting point of the cutting machining of the workpiece here. These regions are thus ruled out as possible positions for starting points of the cutting machining in the course of the further method.

The method may further comprise a step of establishing end-point-free regions, these being established depending on a shape of the cutting contour and alternatively or additionally depending on requirements for the cutting quality. For example, it can be disadvantageous if the end point of the cutting machining lies in certain regions of the cutting contour, since typically the quality of the cutting machining can be lower in the region of the end point. In the further method, it is thus ruled out that end points of the cutting machining lie in these regions. In this respect, what is meant by an end point is the end of a continuous cutting line. The overall machining of a workpiece may include multiple individual cutting lines of this type, each of which comprises a starting point and an end point. Typically, a workpiece part is cut out of the workpiece along a continuous cutting line. Typically, what can be meant by a starting point is the point at which the cutting machining begins when a workpiece part is being cut out and what can be meant by the end point is the point at which the cutting out of the respective workpiece part concludes.

The method further comprises a step of establishing starting-point-free and end-point-free regions depending on the inferred or measured position of the support points and/or the relative position of the workpiece with respect to the support points. Typically, those points that lie in regions in direct contact with the workpiece support are ruled out as starting points and as end points.

The method further comprises a step of establishing a grid of possible starting points and end points, omitting the starting-point-free and end-point-free regions determined in advance. No starting points and no end points should lie in the above-described regions. In the current step, the course of the cutting contour is subdivided into a grid, that is to say into individual points at a certain distance from one another. Here, the distance may be different between individual points. Typically, the distance between the individual points is the same in each case, albeit except for the regions in which starting points and end points are ruled out.

The method further comprises either a step of calculating a torque in a stabilizing and/or tilting direction about a relevant tilt axis for each of the points on the grid taking into account the shape of the cutting contour and at least the material thickness, material density and/or the gas pressure of the cutting head, or a step of calculating a tilt height and/or a tilt depth for each of the points on the grid taking into account the shape of the cutting contour and the position of the support points. For the individual points, the maximum tilt height and tilt depth are thus determined taking into account the above-mentioned parameters and for example calculation models, when the individual points serve as a starting point or end point. It is likewise possible to calculate the torques in the stabilizing or tilting direction for each of these points.

The method may further comprise a step in which a priority of points on the grid is set, ordered by the highest torques in the stabilizing direction and/or the lowest tilt heights or tilt depths or torques in the tilting direction, and, if appropriate, is transmitted to a route planning means of the cutting head. In this way, it is possible for example for route planning to be ascertained taking into account the probability of tilting and the possible tilt heights or tilt depths of each point.

The method may further comprise selecting one of the points on the grid and carrying out the cutting machining.

The method may further comprise the fact that the points on the grid are spaced apart from one another by between 1 mm and 12 mm, in particular between 2 mm and 10 mm, in particular between 3 mm and 8 mm, in particular between 4 mm and 6 mm. The different lower limits of the intervals specified are also possible in combination with each different upper limit, just as the individual upper limits specified are possible in combination with the different lower limits specified.

The method may further comprise the fact that the position of the support points and/or the relative position of the workpiece with respect to the support points is measured by an image recording of the workpiece support after the workpiece has been placed on, or that the position of the support points and/or the relative position of the workpiece with respect to the support points is measured by laser triangulation during a travel of a loading device, which places the workpiece on the workpiece support.

The method may further comprise, in the step of establishing starting-point-free regions depending on a shape of the cutting contour, the fact that regions with undercuts exceeding a limit value with regard to a shape parameter of the undercut are established as starting-point-free. For example, regions in which there is too narrow an undercut can be ruled out as possible starting points.

The method may further comprise, in the step of establishing end-point-free regions, the fact that regions with increased requirements for the local cutting quality are established as end-point-free regions. As already mentioned above, in the region around the end point the cutting quality can be lower, and therefore regions with increased requirements for the cutting quality are ruled out of consideration as possible end points.

The method may further comprise, in the step of establishing starting-point-free and end-point-free regions, the fact that regions of the cutting contour that lie directly above support points are established as starting-point-free and end-point-free regions. Starting points and end points should therefore not be in direct contact with the support points.

The method may further comprise the fact that each of the points on the grid is assigned a surrounding region along the cutting contour, and the route planning means selects one of the points on the grid on the basis of tilt height, tilt depth, torque in the stabilizing direction and/or torque in the tilting direction and selects an actual starting point of the cutting machining within the region along the cutting contour that is assigned to this point. While the calculations on the basis of tilt height, tilt depth and the torques have to be made only for the respective points on the grid, this minimizing the calculation outlay, taking into account regions along the cutting contour that are assigned to the respective points for the route planning (actual starting points do not have to lie on the points of the grid, but only within the assigned regions) allows higher flexibility in terms of the route planning, since surrounding (on the basis of the points on the grid) locations can also be taken into consideration as starting point or end point for optimizing the movement of the cutting head. Here, what is meant by on the basis of tilt height, tilt depth, torque in the stabilizing direction and/or torque in the tilting direction is that these values are taken into account in the selection. For example, the point with the most favorable value in this respect can be used. It is also possible for multiple points with values in, above or below a determined threshold to be selected and the final selection to be made on the basis of optimization of the route planning.

In an embodiment, the invention comprises a software program product with control instructions for carrying out the method for cutting machining or an algorithm for ascertaining the control instructions for carrying out the method, the control instructions or the algorithm being stored on a data carrier which can be connected to a control unit of the beam cutting apparatus for data exchange purposes.

The data carrier may be in the form of a transportable storage medium or a server incorporated in a communications network.

Further features, possible applications and advantages of the invention will become apparent from the following description of exemplary embodiments of the invention, which will be discussed on the basis of the drawing, it being possible for the features to be essential to the invention both individually and in different combinations, without this being explicitly pointed out again. In the drawing:

In the following figures, corresponding components and elements bear the same reference signs. For the sake of better clarity, all reference signs are not reproduced in all of the figures.

FIG. 1 shows a laser cutting apparatus 10 known per se, as an example of a beam cutting apparatus 10, for cutting plate-shaped or tubular workpieces. The laser cutting apparatus 10 comprises a cutting device 12 with a cutting head 14, and a working table 16 with a workpiece support 18 for a workpiece 20.

The workpiece 20 may be a sheet-metal panel or a sheet-metal tube, for example. The workpiece support 18 is spanned by a crossmember 22, which is guided displaceably in a first axial direction (x direction). A guide carriage 24, which is guided displaceably in a second axial direction (y direction) on the crossmember 22 and can be controlled by way of a control unit 23, for the cutting head 14 is mounted on the crossmember 22. The cutting head 14 can thus be displaced in a plane parallel to the workpiece support 18. In addition, the cutting head 14 can be height-displaceable in a third axial direction (z direction) in order to change the distance perpendicular to a workpiece 20.

A laser beam, which emanates from the cutting head 14, serves for the cutting machining of the workpiece. The laser beam is created by a laser beam source 25 and is guided through a beam guiding tube and multiple deflecting mirrors to the cutting head 14, for example. A focused laser beam can be directed onto the workpiece by way of a focusing lens or adaptive optical unit. On account of the displaceability of the crossmember 22 in the x direction and of the guide carriage 24 in the y direction, any desired point on a workpiece 20 can be reached by the laser beam. The cutting head 14 may also be pivotable with respect to the z direction.

If the cutting head 14 is height-displaceable, changing the distance from the workpiece 20 makes it possible to set the focal position of the laser beam. In the focal position, the distance of the cutting head 14 from the workpiece 20, or from the support plane 26 specified below, gives the cutting height of the cutting head 14. The distance of the cutting head 14 from the workpiece 20, in particular the cutting height, can be set before and during the cutting process.

Figure 2:
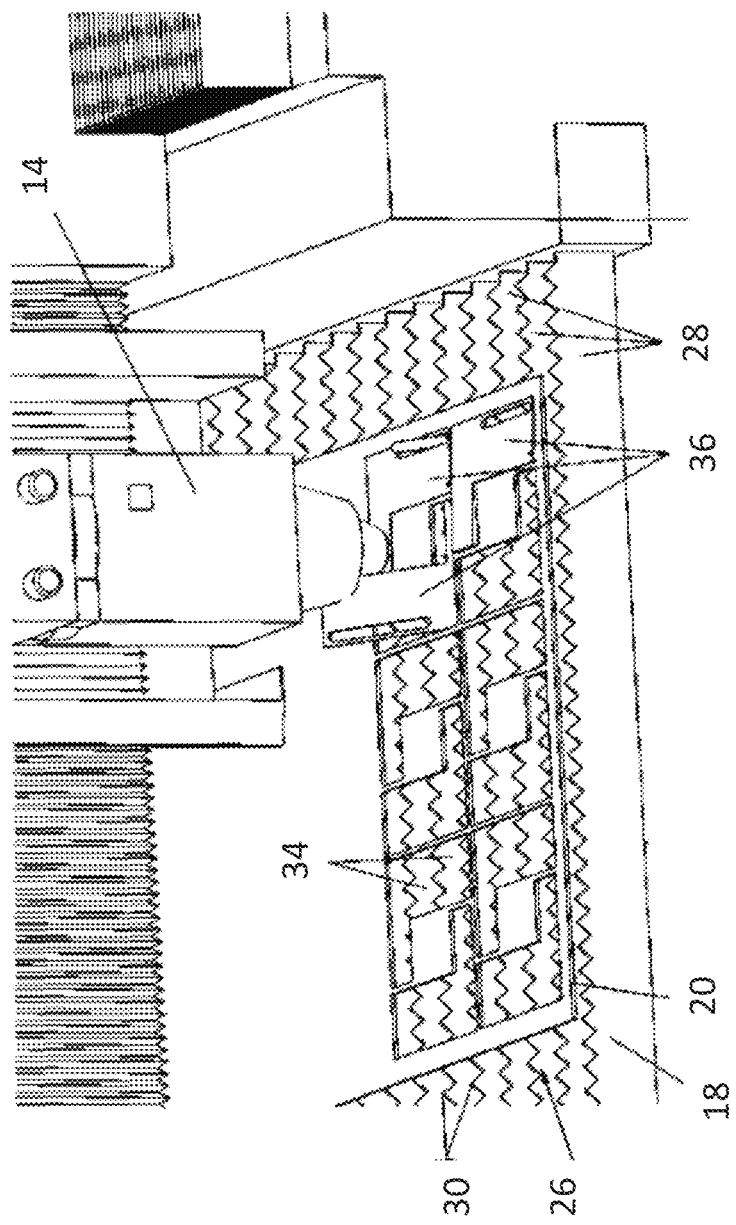
FIG. 2 shows a subregion of the beam cutting apparatus from FIG. 1.

FIG. 2 shows an enlarged illustration of the workpiece support 18 with a workpiece 20 in the form of a sheet-metal panel. In the exemplary embodiment shown, the workpiece support 18 is formed by a multiplicity of support elements 28 with for example triangular bearing point peaks 30, which define the above-mentioned support plane 26 for the workpiece 20 to be machined. The bearing point peaks 30 each form support points 32.

In this instance, the support elements 28 are configured as elongate support webs, for example, which are arranged next to one another at an intermediate distance which is constant, for example, with the result that a depression 34 is formed between two support elements 28. The support elements 28 are arranged in a predetermined grid, and therefore the position of the bearing point peaks 30 can be determined. A suction-extraction device may be included, which makes it possible to extract by suction cutting smoke, slag particles and small waste parts that are produced during the laser cutting.

Since the workpiece support 18 does not support the workpiece 20 over its entire surface area, workpiece parts 36 that are cut free can tilt relative to the workpiece 20 or support plane 26. Whether a cut-out workpiece part 36 tilts or not depends on the number and positions of the bearing point peaks 30 supporting the workpiece part 36.

Irrespective of this, it is also possible for the gas jet pressure during laser cutting to cause a workpiece part 36 to tilt. In particular, cut-out workpiece parts 36 can enter the depressions between the support elements 28.

Figure 3:
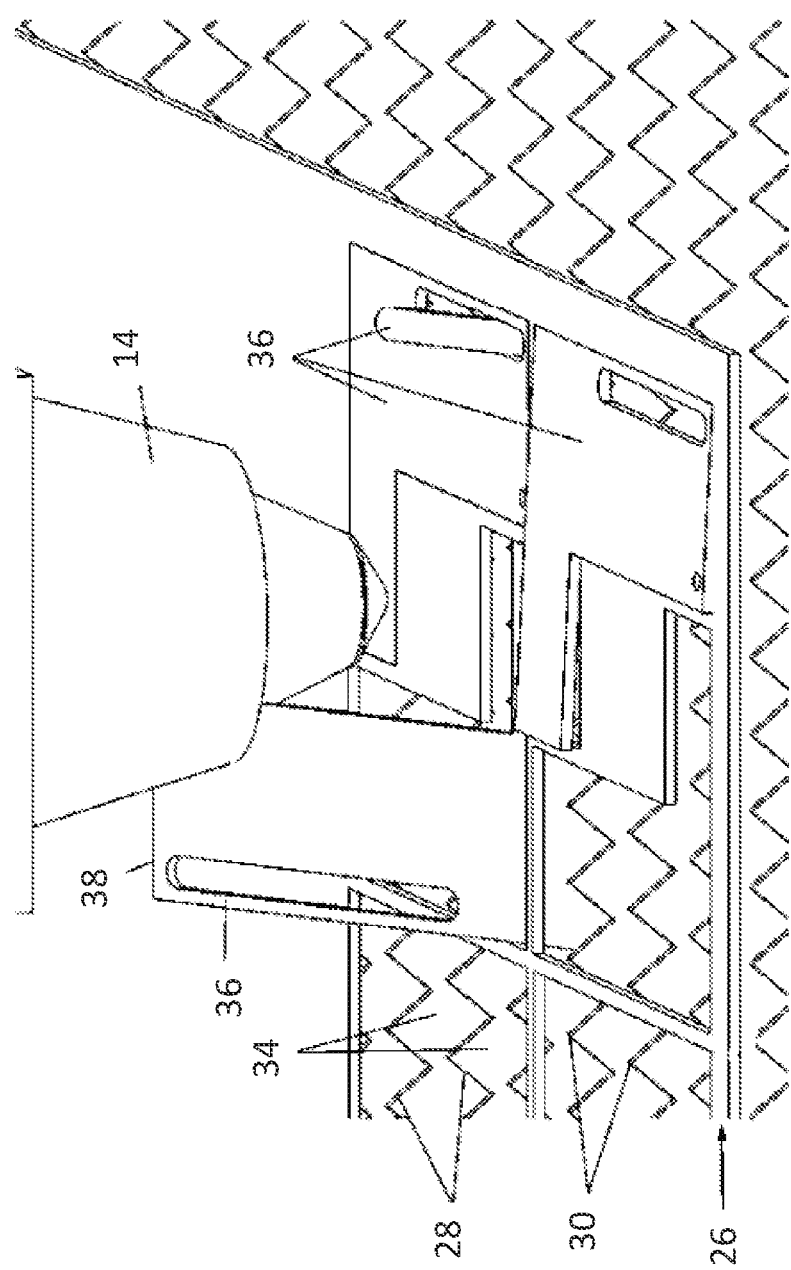
FIG. 3 shows a subregion of the beam cutting apparatus from FIG. 1.

As is depicted in the enlarged illustration of FIG. 3, an upwardly tilted workpiece part 36 can lead to a collision with the cutting head 14. Although a cutting head 14 with a corresponding displacement height can move over the tilted workpiece part 36, it is frequently necessary for the cutting head 14 to be positioned at a relatively low cutting height, with the result that a collision in the event of an upwardly tilted workpiece part 36 is possible. The same applies for a non-height-displaceable cutting head 14, which is always located at the cutting height. Therefore, a collision between a tilted workpiece part 36 and the cutting head 14 depends on the dimensions of the cutting head 14 at the cutting height and the tilt height of the workpiece part 36. In the exemplary embodiment shown, a side edge 38 of the rectangular workpiece part 36 projects upward. An opposite side edge 38 is inserted in a depression. The cutting head 14 has a conically widening shape with a cross-sectional area in the form of a circular disk parallel to the support plane 26. Accordingly, given a constant height of the cutting head 14, the radius of its cross-sectional area increases as the distance from the support plane 26 increases.

FIG. 4 shows a sheet-metal tube, from which a workpiece part 36 is cut off, as workpiece 20. The sheet-metal tube has a hook-shaped projection 40 on its upper edge.

FIG. 5 illustrates the cutting process on the workpiece 20 in the form of a sheet-metal tube from FIG. 4.

A situation is shown in which the cut-free workpiece part 36 is caught on the rest of the workpiece 20 as a result of the projection 40 and tilts relative to the workpiece 20. In this way, the illustrated collision between the cutting head 14, located at the cutting height, and the tilted workpiece part 36 can occur. The tilting of the workpiece part 36 results in a tilt height 42 and a tilt depth 44.

The left-hand side of FIG. 6 illustrates a workpiece 20 and cutting contours 46 to be followed by the cutting head 14, by means of which cutting contours a respective workpiece part is to be separated from the workpiece 20.

Regions 48 along the cutting contour 46 that should remain free of starting points (puncture sites) are characterized by external dotted lines along the cutting contour. Correspondingly, regions 50 along the cutting contour 46 that should remain free of end points (cutting-free points) are characterized by internal dotted lines.

In the rest of the regions of the cutting contour 46, it is subdivided into a grid of points 52, the reference signs of the points 52a-52d of which have been emphasized.

FIG. 7 plots the torque 55 along the route 57 around the cutting contour 46 from point 52a via the points on the grid back to point 52a. The points 52b, 52c and 52d are emphasized here. From point 52a toward point 52c, the torque is in the stabilizing region and falls after point 52c into the destabilizing, tilting region. Points 52a-52c lie in the stabilizing region. Point 52d lies in the destabilizing, tilting region. The maximum stabilizing moment is at point 52c, this being emphasized by an arrow.

In order to increase the safety of a cutting process, or to minimize the risk of tilting, a route planning means can thus select point 52c as a starting point (puncture point) and end point (cutting-free point).

The method according to the invention for the cutting machining of the workpiece 20 serves (in the example of the beam cutting apparatus 10 shown in the figures) for cutting a corresponding workpiece part 36 out of the workpiece 20 along the cutting contour 46. The beam cutting apparatus 10 with the cutting head 14 is used for the cutting machining.

As already mentioned, the beam cutting apparatus 10 comprises a workpiece support 18 with a plurality of support points 32 for receiving the workpiece 20 and the method comprises the following steps:

A step of determining the position of the support points 32, this step comprising either measuring (image recording after the placing-on, and/or laser triangulation during the loading) a position of the support points 32 and/or a relative position of the workpiece 20 with respect to the support points 32, or inferring the position of the support points 32 and/or the relative position of the workpiece (20) with respect to the support points 32.

A step of establishing starting-point-free regions 48 depending on a shape of the cutting contour 46. In the process, for example, regions with undercuts exceeding a limit value with regard to a shape parameter of the undercut can be established as starting-point-free.

If appropriate, a step of establishing end-point-free regions 50 depending on a shape of the cutting contour 46 and/or requirements for the cutting quality.

A step of establishing starting-point-free and end-point-free regions 48, 50 depending on the inferred or measured position of the support points 32 and/or the relative position of the workpiece 20 with respect to the support points 32. In the process, for example, regions of the cutting contour 46 that lie directly above support points 32 can be established as starting-point-free and end-point-free regions 48, 50.

A step of establishing a grid of possible starting points and end points (these are the points 52 on the grid), omitting the starting-point-free and end-point-free regions 48, 50 determined in advance.

The method further comprises either a step of calculating a torque 55 in a stabilizing and/or tilting direction about a relevant tilt axis for each of the points on the grid taking into account the shape of the cutting contour 46 and at least the material thickness, material density and/or the gas pressure of the cutting head 14, or a step of calculating a tilt height 42 and/or a tilt depth 44 for each of the points 52 on the grid taking into account the shape of the cutting contour 46 and the position of the support points 32.

Provision may further be made for a step in which a priority of points 52 on the grid is set, ordered by the highest torques 55 in the stabilizing direction and/or the lowest tilt heights 42 or tilt depths 44 or torques 55 in the tilting direction, and, if appropriate, is transmitted to a route planning means of the cutting head 14.

Provision may further be made for selecting one of the points 52 on the grid and carrying out the cutting machining.

Each of the points 52 on the grid can be assigned a surrounding region along the cutting contour 46, and the route planning means can select one of the points 52 on the grid on the basis of tilt height 42, tilt depth 44, torque 55 in the stabilizing direction and/or torque 55 in the tilting direction and select an actual starting point of the cutting machining within the region along the cutting contour 46 that is assigned to this point.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for cutting machining of a plate-shaped workpiece, a workpiece part being cut out of the workpiece along a cutting contour, a beam cutting apparatus with a cutting head being used for the cutting machining, and the beam cutting apparatus comprising a workpiece support with a plurality of support points for receiving the workpiece, the method comprising:

determining a position of the support points either by:

measuring a position of the support points and/or a relative position of the workpiece with respect to the support points, or inferring the position of the support points and/or the relative position of the workpiece with respect to the support points;

establishing starting-point-free regions depending on a shape of the cutting contour, and depending on the inferred or measured position of the support points and/or the relative position of the workpiece with respect to the support points;

establishing end-point-free regions depending on the shape of the cutting contour and/or requirements for a cutting quality, and depending on the inferred or measured position of the support points and/or the relative position of the workpiece with respect to the support points;

establishing a grid of points comprising possible starting points and end points, omitting the starting-point-free and end-point-free regions determined in advance;

either:
- calculating a torque in a stabilizing and/or tilting direction about a relevant tilt axis for each of the points on the grid taking into account the shape of the cutting contour and also at least the material thickness, material density and/or the gas pressure of the cutting head, or
- calculating a tilt height and/or a tilt depth for each of the points on the grid taking into account the shape of the cutting contour and also the position of the support points;

setting a priority of the points on the grid, ordered by highest torques in the stabilizing direction and/or lowest tilt heights or tilt depths or torques in the tilting direction;

selecting one of the points on the grid based on the set priority of the points on the grid; and carrying out the cutting machining according to the set priority of points.

2. The method as claimed in claim 1, wherein the points on the grid are spaced apart from one another by between 1 mm and 12 mm.

3. The method as claimed in claim 1, wherein the position of the support points and/or the relative position of the workpiece with respect to the support points is measured by an image recording of the workpiece support after the workpiece has been placed on, or wherein the position of the support points and/or the relative position of the workpiece with respect to the support points is measured by laser triangulation during a travel of a loading device, which places the workpiece on the workpiece support.

4. The method as claimed in claim 1, wherein, in the step of establishing starting-point-free regions depending on a shape of the cutting contour, regions with undercuts exceeding a limit value with regard to a shape parameter of the undercut are established as starting-point-free.

5. The method as claimed in claim 1, wherein, in the step of establishing end-point-free regions, regions with heightened local cutting quality requirements are established as end-point-free regions.

6. The method as claimed in claim 1, wherein, in the step of establishing starting-point-free and end-point-free regions, regions of the cutting contour that lie directly above support points are established as starting-point-free and end-point-free regions.

7. The method as claimed in claim 1, wherein each of the points on the grid is assigned a surrounding region along the cutting contour, the method further comprising selecting one of the points on the grid on the basis of tilt height, tilt depth, torque in the stabilizing direction and/or torque in the tilting direction and selecting an actual starting point of the cutting machining within the region along the cutting contour that is assigned to this point.

* * * * *